United States Patent
Anderson et al.

(10) Patent No.: US 9,936,637 B2
(45) Date of Patent: Apr. 10, 2018

(54) COMBINE HARVESTER COMBINING ROW CROP GUIDANCE AND PLANT ATTRIBUTE MEASUREMENT

(71) Applicant: Deere & Company, Moline, IL (US)

(72) Inventors: Noel W. Anderson, Fargo, ND (US); Niels Dybro, Sherrard, IL (US)

(73) Assignee: Deere & Company, Moline, IL (US)

( * ) Notice: Subject to any disclaimer, the term of this patent is extended or adjusted under 35 U.S.C. 154(b) by 134 days.

(21) Appl. No.: 14/712,449

(22) Filed: May 14, 2015

(65) Prior Publication Data

US 2016/0330907 A1    Nov. 17, 2016

(51) Int. Cl.
   *A01D 41/127*    (2006.01)
   *A01D 41/06*     (2006.01)

(52) U.S. Cl.
   CPC ......... *A01D 41/1278* (2013.01); *A01D 41/06* (2013.01); *A01D 41/127* (2013.01); *A01D 41/1271* (2013.01)

(58) Field of Classification Search
   CPC .............. A01D 41/127; A01D 41/271; A01D 41/1271; A01D 41/1278; G01N 3/30; G01B 21/08; G01B 21/12; G01B 21/10
   USPC ................. 56/10.2 R, 10.2 B, 10.2 F, 10.2 H
   See application file for complete search history.

(56) References Cited

U.S. PATENT DOCUMENTS

| | | | |
|---|---|---|---|
| 4,166,349 A * | 9/1979 | Coenenberg | A01D 41/1278 56/10.2 F |
| 4,295,323 A * | 10/1981 | Maier | A01D 41/1278 56/10.2 R |
| 6,813,873 B2 * | 11/2004 | Allworden | A01D 41/141 56/10.2 E |
| 7,716,905 B2 * | 5/2010 | Wilcox | A01B 69/008 56/10.2 E |
| 7,725,233 B2 * | 5/2010 | Hendrickson | A01B 69/008 180/401 |
| 8,010,261 B2 * | 8/2011 | Brubaker | A01D 41/1278 460/1 |
| 9,320,196 B2 * | 4/2016 | Dybro | A01D 45/021 |
| 9,322,629 B2 * | 4/2016 | Sauder | A01D 45/021 |
| 2009/0282794 A1 | 11/2009 | Wilcox et al. | |
| 2014/0230391 A1 | 8/2014 | Hendrickson et al. | |
| 2014/0230396 A1 | 8/2014 | Dybro et al. | |
| 2016/0029558 A1 * | 2/2016 | Dybro | A01B 79/005 56/1 |
| 2016/0086032 A1 * | 3/2016 | Pickett | G06F 17/40 382/110 |
| 2016/0338267 A1 * | 11/2016 | Anderson | A01B 79/005 |

OTHER PUBLICATIONS

European Search Report in foreign counterpart application 16167995.6, dated Sep. 27, 2016 (7 pages).

* cited by examiner

*Primary Examiner* — John Weiss

(74) *Attorney, Agent, or Firm* — Rathe Lindenbaum LLP

(57) ABSTRACT

A system for measuring plant attributes includes an ECU mounted on a combine, a plant attribute sensor, a ground speed sensor and a vehicle guidance sensor. The ECU is configured to use a signal from a vehicle guidance sensor disposed in front of plant attribute sensor to create a signal sampling window in which signals from the plant attribute sensor will be read and to reject signals from the plant attribute sensors outside of this signal sampling window.

20 Claims, 5 Drawing Sheets

COMBINE HARVESTER COMBINING ROW CROP GUIDANCE AND PLANT ATTRIBUTE MEASUREMENT

FIELD OF THE INVENTION

This invention relates generally to combine harvesters for row crop harvesting. More particularly it relates to vehicle guidance and plant attribute sensing.

BACKGROUND OF THE INVENTION

Combine harvesters comprise vehicle guidance systems to guide the vehicle through the field as it harvests crops. Combine harvesters further comprise plant attribute measurement systems.

The accuracy of plant attribute measurement systems of combine harvesters can be improved by employing sensor data from combine harvester vehicle guidance systems.

US 2014/0230396 A1 and US 2014/0230391 A1 disclose crop plant attribute sensing systems using sensors to detect attributes of individual plants. The sensors detect attributes of crop plants passing into a row unit of an agricultural harvesting head. Among the sensors include impact sensors for sensing the impact of ears of corn on stripping plates (also known as a deck plates). These publications are incorporated herein by reference for all that they teach.

U.S. patent application Ser. No. 14/272,910 also discloses a crop plant attribute sensing system using sensors to detect attributes of individual plants. The sensors include a sensor configured to sense the crop stalk thickness or diameter. This application is incorporated herein by reference for all that it teaches.

U.S. Pat. No. 7,716,905 B2 discloses a vehicle guidance sensor and vehicle guidance system for a row crop harvesting head (shown as a corn head) that is mounted on a combine harvester. The vehicle guidance sensor includes two feelers that are flexible and are mounted to a forward tip of a crop divider. As the row crop harvesting head is conveyed through a field, rose of crops pass between the tips of adjacent crop dividers. These crop plants deflect the feelers backward (i.e. toward the rear of the row crop harvesting head and away from the direction of travel). The deflection to sense to bind electronic circuit, and is used to steer the combine harvester upon which the row crop harvesting head is mounted. The steering is calculated to sever the row crop harvesting heads such that the rows of crop equidistant between adjacent crop dividers. This patent is incorporated herein by reference for all that it teaches.

U.S. Pat. No. 8,010,261 discloses a plant attribute sensor mounted on the forward ends of two adjacent crop dividers to sense the presence and lateral position of a plant stalk as it passes between the two adjacent crop dividers.

One problem with the sensing arrangements of the systems described above is their susceptibility to noise and interference from other vibrations and other corn plants. In particular, stray vibrations from other portions of the vehicle, the presence of trash plants, sticks, and other material that may be drawn between the stalk rolls can interfere with measurements taken of plant attributes.

It is an object of this invention to provide an improved method for determining plant attributes by filtering signals from the plant attribute sensors.

It is also an object of this invention to use a signal from a vehicle guidance sensor disposed in front of plant attribute sensors to create a signal sampling window in which signals from the plant attribute sensors will be read and to reject signals from the plant attribute sensors outside of this signal sampling window.

SUMMARY OF THE INVENTION

In accordance with one aspect of the invention, a system for measuring plant attributes is provided comprising: an ECU mounted on a combine harvester; a vehicle guidance sensor disposed on a row crop harvesting head of a combine harvester and coupled to the ECU to sense a position of the row crop harvesting head with respect to at least one row of crops being harvested and to provide a guidance signal to the ECU indicative of this position; A plant attribute sensor disposed on a row crop harvesting head of a combine harvester and coupled to the ECU to sense an attribute of the crops being harvested and to provide a crop signal to the ECU indicative of this attribute; A vehicle speed sensor coupled to the ECU and configured to provide a ground speed signal to the ECU indicative of a ground speed of the row crop harvesting head; wherein the ECU is configured to receive the guidance signal and the crop signal and the ground speed signal, to calculate a signal sampling window in which to accept a plant datum from the plant attribute sensor, and to ignore plant signals received outside that signal sampling window.

The plant signal may indicate a plant stalk diameter.

The plant signal may indicate a plant yield.

The row crop harvesting head may be a corn head having a plurality of crop dividers, and wherein the vehicle guidance sensor are feelers mounted at a forward tip of at least one of the crop dividers.

The ECU may be further configured to receive the guidance signal, to receive the speed signal, and to calculate the signal sampling window based upon at least the guidance signal and the speed signal.

The ECU may be further configured to reject the plant signal when it is received outside of the signal sampling window and to accept the plant signal when it is received inside of the signal sampling window.

The feelers may be disposed on the forward tip such that they are deflected by plant stalks, and wherein the vehicle guidance sensor generates the guidance signal in response to such deflection.

The plant attribute sensor may comprise at least one movable stripping plate of a row unit, wherein the at least one movable stripping plate is movable by a plant stalk entering the row unit. The plant attribute sensor may be configured to generate the plant signal based upon the amount of deflection of the at least one movable stripping plate by the plant stalk entering the row unit.

The plant attribute sensor may comprise an accelerometer, wherein the accelerometer may be fixed to a row unit of a corn head.

DETAILED DESCRIPTION OF THE PREFERRED EMBODIMENTS

Figure 1:
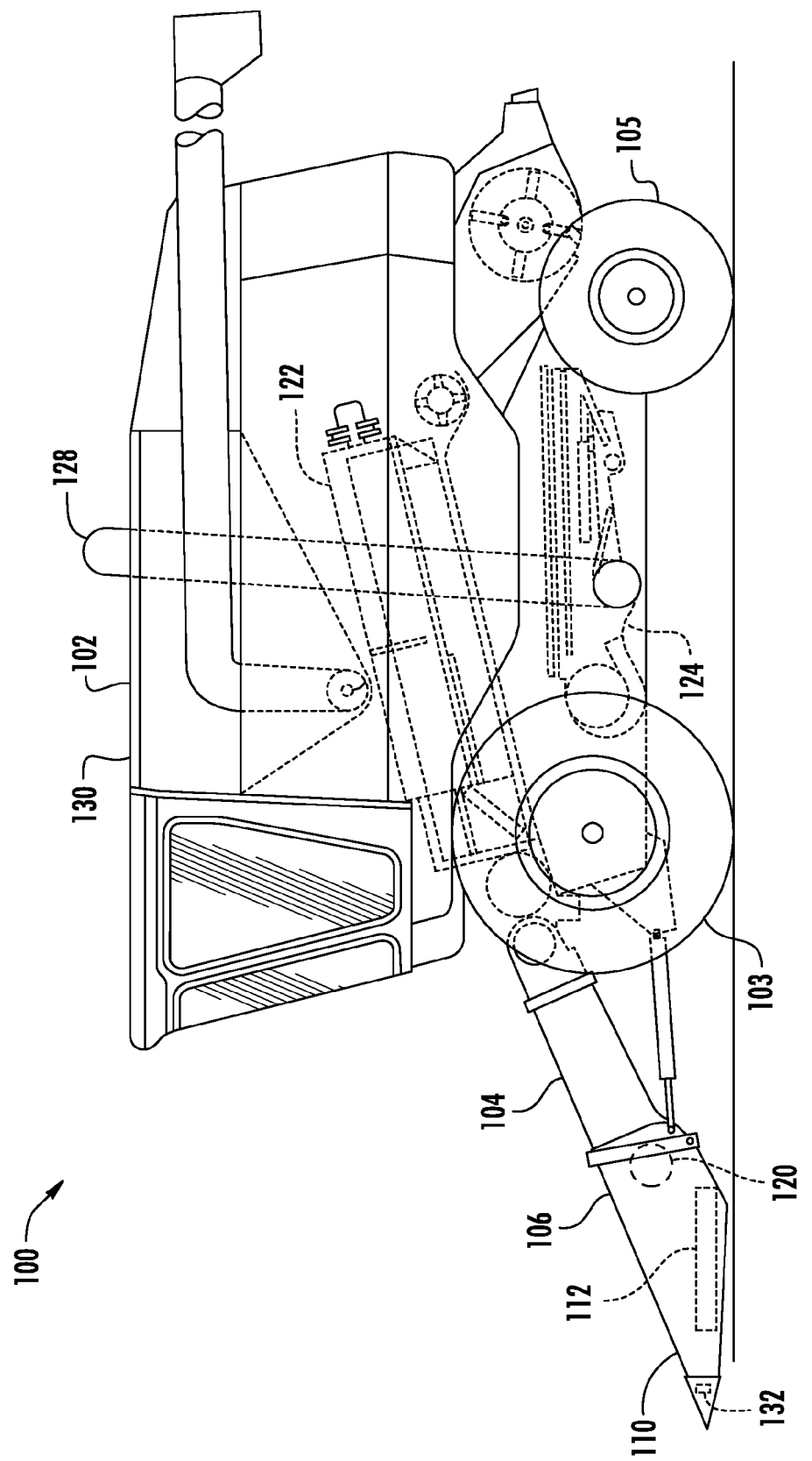
FIG. 1 is a side view of a combine harvester.
Figure 2:
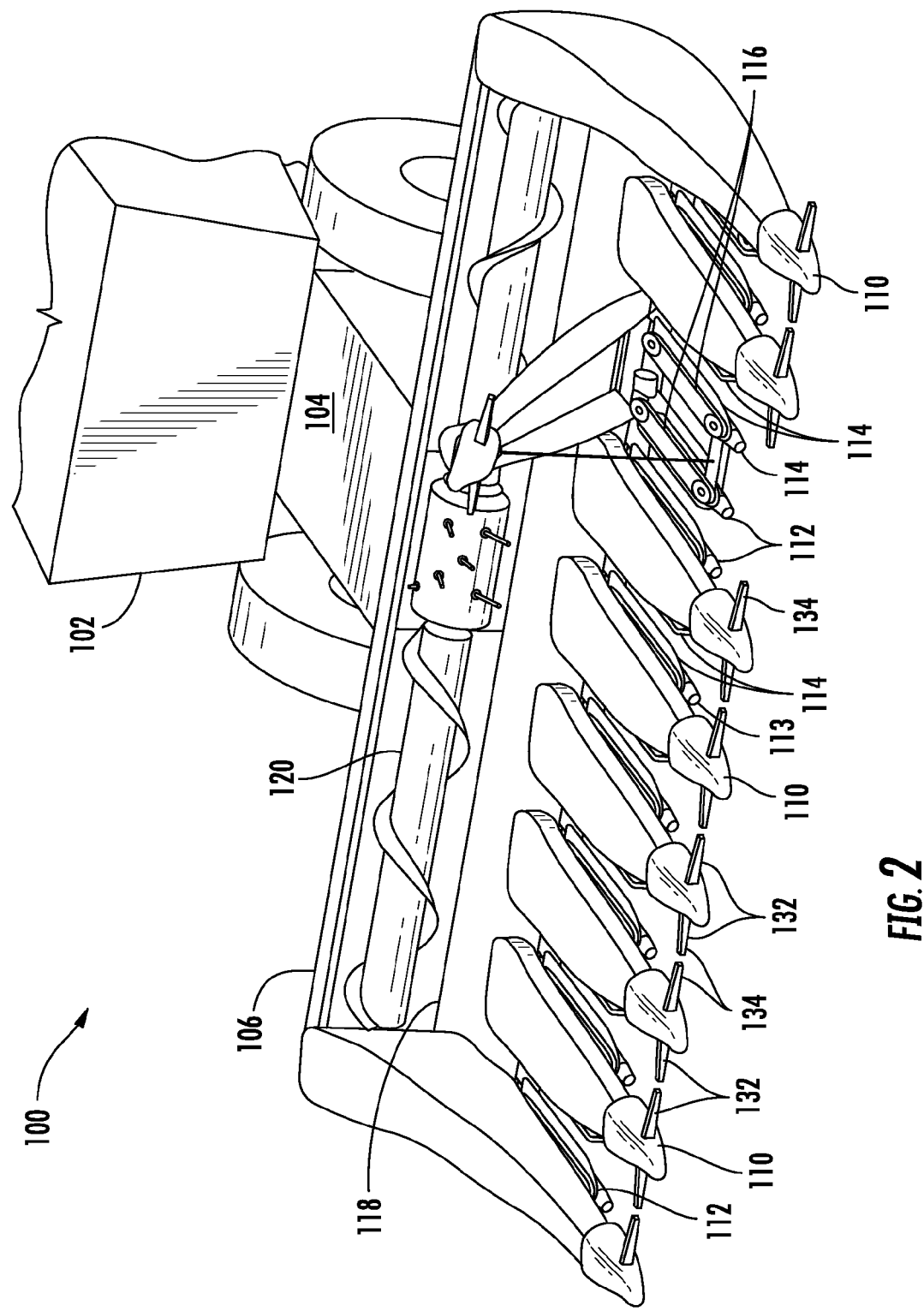
FIG. 2 is a front perspective view of the combine harvester of FIG. 1.

Referring to FIGS. 1 and 2, an agricultural harvesting vehicle 100 comprises a combine harvester 102 having a feederhouse 104 extending forward therefrom, and a row crop harvesting head 106 (here shown as a corn head) supported on a forward end of the feederhouse 104. Combine 102 is supported on two front wheels 103 that are driven by an engine (not shown) and two rear wheels 105 that are steerable by a steering actuator 146 (FIG. 3) in a conventional manner.

As the agricultural harvesting vehicle 100 travels through the field harvesting rows of crop, individual crop plants in each row of crop pass between adjacent crop dividers 110, then further rearward into a row unit 112. The row unit 112 includes two spaced apart stalk rolls 113 that extend in a forward direction and define a gap therebetween for receiving stalks of the crop plants. As each crop plant is received into the gap, the stalk rolls 113 engage opposite sides of the stalk of the crop plant and pull the stalks downward.

Stripping plates 114 are disposed above the stalk rolls and on either side of the gap. As the stalk rolls pull the stalk of the crop plant downward, ears of corn extending from the stalk of the crop plant impact the stripping plates 114, causing the ears to be broken off the stalk.

These ears tumble and bounce upon the stripping plates 114, and are carried rearward by gathering chains 116 into a laterally extending trough 118 in the corn head.

A transverse rotating auger 120 is disposed in the laterally extending trough. The transverse rotating auger 120 has flights that engage the broken-off ears of corn and carry them to a central region of the row crop harvesting head 106.

Once in the central region, flights on the transverse rotating auger 120 carry the ears of corn rearward and into the feederhouse 104 of the combine harvester 102.

A conveyor (not shown) in the feederhouse 104 carries the ears of corn rearward and into the body of the combine harvester 102.

Once inside the body of the combine harvester 102, the ears of corn are threshed by at least one threshing drum 122, and separated from the material other than grain (MOG).

The kernels of grain are cleaned in a cleaning shoe 124. The now-clean kernels of grain are carried upward by a grain elevator 128 and are deposited in a grain tank 130.

A vehicle guidance sensor 132 is fixed to a forward end of a crop divider 110 on the row crop harvesting head 106. The vehicle guidance sensor 132 has two feelers 134 extending outwardly from each side of the crop divider 110. As the vehicle moves forward through the field harvesting crops the plant stalks in the row of crop 108 move rearward into the space between adjacent crop dividers 110. The plant stalks push against the feelers 134 and deflect them backwards. This backward deflection causes the vehicle guidance sensor 132 to generate a signal indicating the relative location of the plant stalk with respect to the crop dividers 110.

A first plant attribute sensor 136, is shown as a plant stalk thickness or diameter sensor coupled to a movable stripper plate. A second plant attribute sensor 138 is shown as an accelerometer disposed to sense the impact of ears of corn against the stripper plate.

Figure 3:
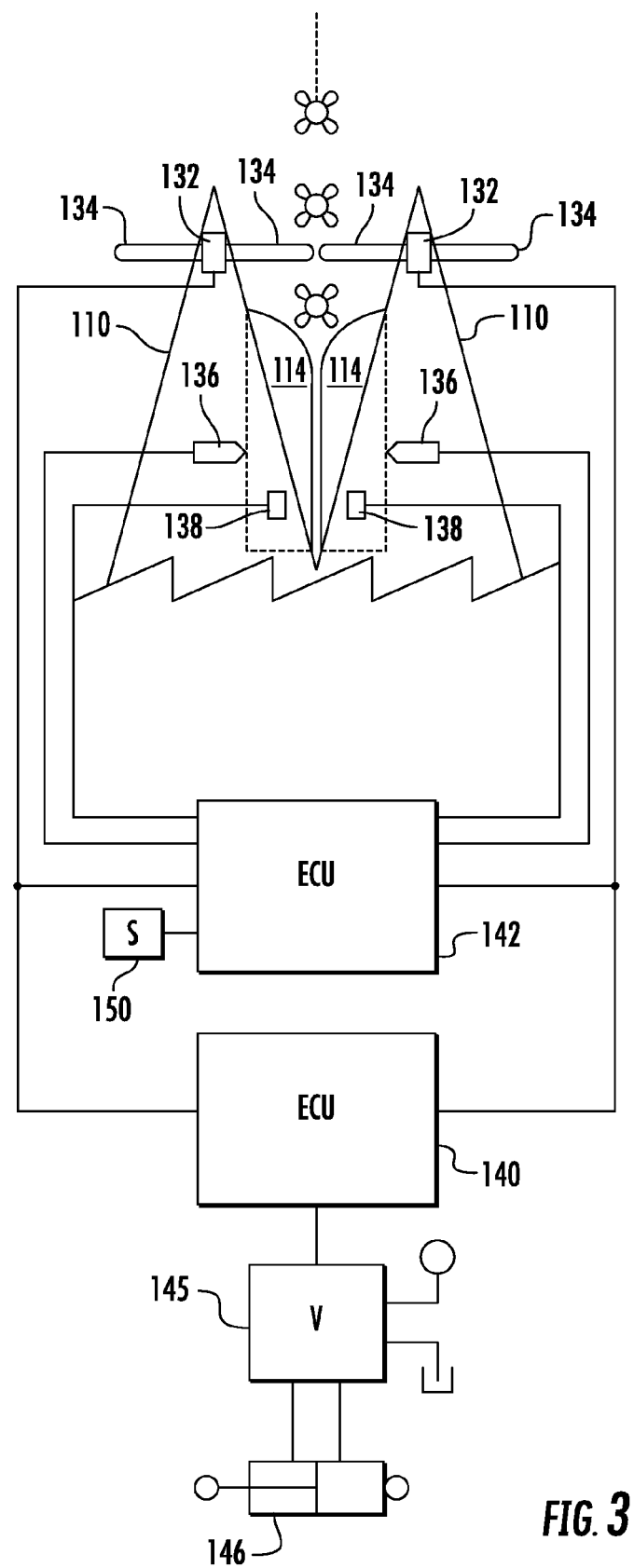
FIG. 3 is a fragmentary plan view of a typical crop divider and row unit including a sensor arrangement, and schematic diagram of a system for measuring plant attributes.

FIG. 3 illustrates a vehicle guidance system 140 and a system for measuring plant attributes 142.

The vehicle guidance system 140 comprises the vehicle guidance sensor 132, an ECU 144, a valve 145 and a steering actuator 146. The ECU 144 is coupled to and drives the valve 145. The valve 145, in turn is fluidly coupled to the steering actuator 146 and controls a flow of hydraulic fluid to and from the steering actuator 146. The steering actuator 146 is coupled to the rear wheels of the combine harvester 102 to steer the combine harvester 102.

The ECU 144 is configured to receive signals from the vehicle guidance sensor 132, to calculate a steering signal at least from the signals of the vehicle guidance sensor 132, and to responsively control the steering actuator 146 to steer the combine harvester 102 in order to center the crop plants between adjacent crop dividers. This operation is discussed in greater detail in U.S. Pat. No. 7,716,905 B2.

The system for measuring plant attributes 142 comprises the vehicle guidance sensor 132, the first plant attribute sensor 136, the second plant attribute sensor 138, and an ECU 148.

The ECU 148 is configured to receive signals from the vehicle guidance sensor 132, the first plant attribute sensor 136, the second plant attribute sensor 138 and a vehicle speed sensor 150. The ECU 148 is further configured to responsively create a signal sampling window in which signals from the first plant attribute sensor 136 and the second plant attribute sensor 138 will be received and processed for determining plant attributes. The ECU 148 is further configured to not use signals from the first plant attribute sensor 136 and the second plant attribute sensor 138 that fall outside this signal sampling window for determining plant attributes.

Figure 4:
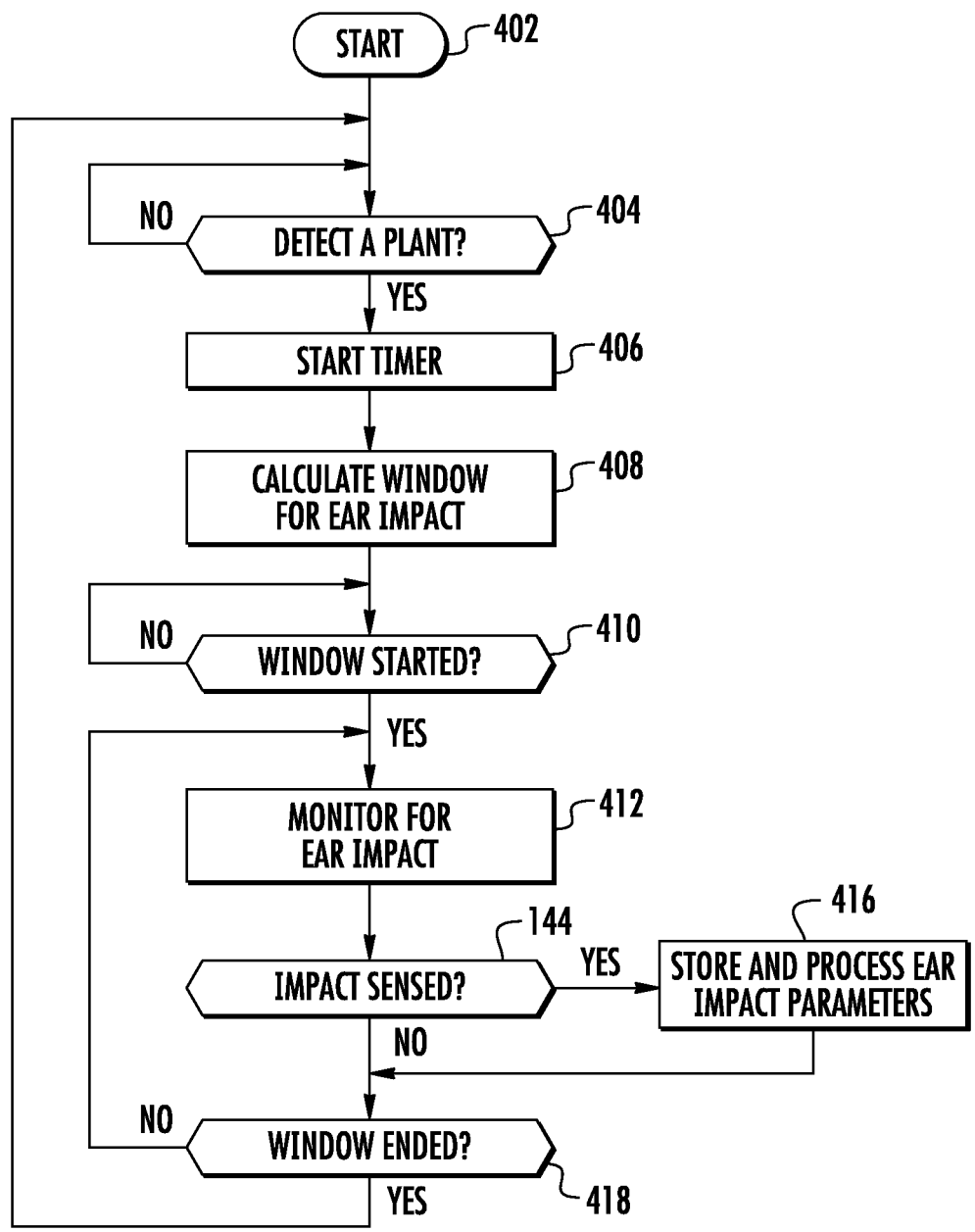
FIG. 4 is a flowchart showing the operation of the system for measuring plant attributes of FIG. 3.

FIG. 4 is a flowchart of the operation of ECU 148 as it receives the signals from the various sensors, calculates a signal sampling window of actual plant attributes, and receives and processes the actual plant attributes determined during this signal sampling window. ECU 148 includes a digital microprocessor, and the operations described herein are stored as digital instructions in an electronic memory circuit with the ECU 148.

In step 402 the process starts. In step 404, the ECU 148 begins polling the vehicle guidance sensor 132 to detect the presence of a plant. The ECU 148 polls the vehicle guidance sensor 132 until it detects a signal from the vehicle guidance sensor 132. The signal from the vehicle guidance sensor 132 occurs whenever a plant stalk deflects of the feelers 134 backward. When this occurs, the ECU 148 continues to step 406 and starts an internal timer.

The ECU 148 then continues to step 408 and calculates a signal sampling window in which signals from the first plant attribute sensor 136 are caused by the impact or impacts of ears of corn upon the stripping plate 114 as the ears are being snapped from the stalk of the corn plant from which they are growing. Data derived from these impacts comprise plant attributes. This derived data may include the mass of each ear, the average mass of the ears, the amount of grain on each ear, the harvesting rate, etc. The impacts of ears of corn on the stripper plate are determined by signals from the second plant attribute sensor 138.

Figure 5:
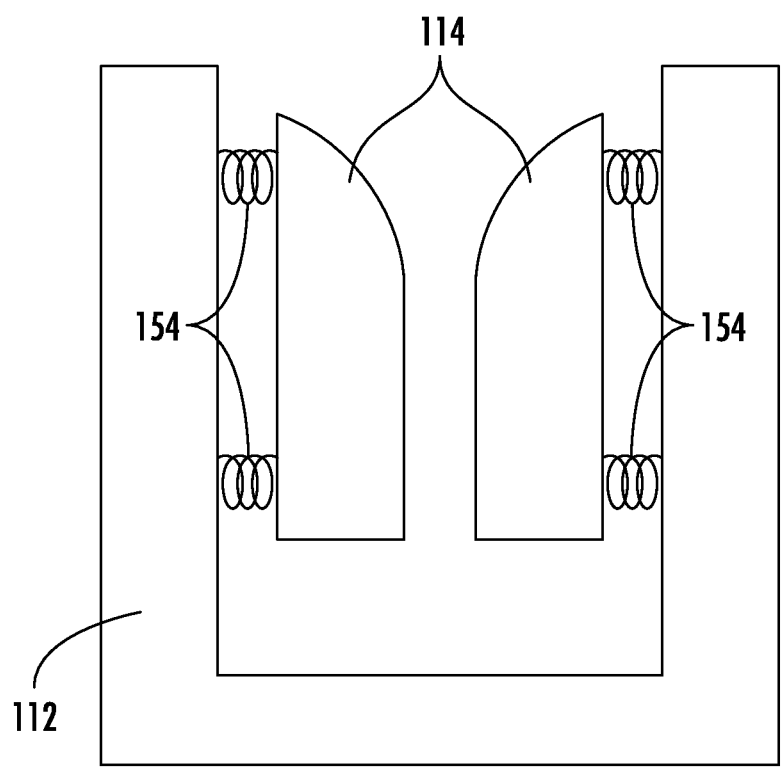
FIG. 5 is a top view illustrating a portion of the row unit of FIG. 3.

Furthermore, plant attributes also constitute the size of the gap between the stripper plates 114 when the stalk is pulled into the gap between the stripper plates 114. The size of the gap (and therefore the thickness or diameter of the plant stalk) is indicated by signals from the first plant attribute sensor 136. FIG. 5 illustrates a portion of the system shown in FIG. 3 in more detail, illustrating one example of how stripper plates 114 of a row unit 112 may be movably supported. In the example illustrated, each of plates 114 are movably supported by springs 154. As shown in FIG. 3, sensors 136 output signals that indicate the size of the gap between stripper plates 114.

The ECU 148 calculates the beginning of the signal sampling window based upon how much time passes until the stalk of the crop plant enters into the gap between the stalk rolls 113 and between the stripper plates 114.

The ECU 148 calculates the end of the signal sampling window based upon the amount of time that will pass until the stalk has been pulled through the stalk rolls 113, stripper plates 114 and all of the ears have been snapped off the stalk of the crop plant.

The start of the signal sampling window and the length of the signal sampling window are dependent on several machine-dependent and operation-dependent factors, such as the speed of the vehicle through the field and the rotational speed of the stalk rolls. The ECU 148 uses speed of the vehicle passing through the field to determine the amount of time for the stalk of the crop plant to enter into the gap between the stalk rolls and stripper plates. The ECU 148 uses the rotational speed of the stalk rolls to determine the amount of time required for the corn stalk to be pulled completely downward between the stalk rolls and all of the ears to be snapped off the stalk.

The ECU 148 then continues to step 410, in which it repeatedly polls the timer it set in step 406 to determine whether the signal sampling window has started, at which time the ECU 148 will sample the signals from the first plant attribute sensor 136 and the second plant attribute sensor 138.

The ECU 148 stays in the polling loop of step 410 until the timer indicates that signals from the first plant attribute sensor 136 and the second plant attribute sensor 138 indicate plant characteristics and therefore should be sampled.

Once the beginning of the signal sampling window has been reached, the ECU 148 then continues to step 412. In step 412, the ECU 148 reads signals from the second plant attribute sensor 138.

The ECU 148 then continues to step 414 in which it analyzes the signals it read from the second plant attribute sensor 138 to determine whether an ear of corn has impacted the stripper plates 114. If the signals indicate that an ear of corn has impacted the stripper plates 114, the ECU 148 continues to step 416 and stores a record of that impact in the internal digital memory associated with the ECU 148. From this data, the ECU 148 (or another ECU) estimates such plant and crop attributes as the crop yield, the mass of the ears, the numbers of ears on the plants, and the amount of grain on the ears.

The ECU 148 then continues to step 416 and checks the timer it set in step 406 to see whether the signal sampling window is complete. If the signal sampling window is not complete, the ECU 148 returns to step 412 and begin sampling again. If the signal sampling window is complete, the ECU 148 returns to step 404 and again begins polling the vehicle guidance sensor 132 to sense the presence of the next crop plant in the row.

The process of FIG. 4 continues throughout harvesting.

The invention claimed is:

1. A system for measuring plant attributes comprising:
a combine harvester;
an electronic control unit (ECU) mounted on the combine harvester;
a vehicle guidance sensor disposed on a row crop harvesting head of the combine harvester and coupled to the ECU to sense a position of the row crop harvesting head with respect to at least one row of crops being harvested and to provide a guidance signal to the ECU indicative of this position;
a plant attribute sensor disposed on the row crop harvesting head of the combine harvester and coupled to the ECU to sense an attribute of a plant of the crops being harvested and to provide a crop plant signal to the ECU indicative of this attribute; and
a vehicle speed sensor coupled to the ECU and configured to provide a ground speed signal to the ECU indicative of the ground speed of the row crop harvesting head;
wherein the ECU is configured (1) to receive the guidance signal and the crop signal and the ground speed signal, (2) to calculate a signal sampling window in time, in which to accept a plant datum from the plant attribute sensor, and (3) to ignore plant signals received outside that signal sampling window.

2. The system for measuring plant attributes of claim 1 wherein the plant signal is indicative of a plant stalk diameter.

3. The system for measuring plant attributes of claim 1 wherein the plant signal is indicative of a plant yield.

4. The system for measuring plant attributes of claim 1 wherein the plant signal is indicative of a plant part.

5. The system for measuring plant attributes of claim 1, wherein the row crop harvesting head is a corn head having a plurality of crop dividers, and wherein the vehicle guidance sensor are feelers mounted at a forward tip of at least one of the crop dividers.

6. The system for measuring plant attributes of claim 5, wherein the ECU is further configured to receive the guidance signal, to receive the speed signal, and to calculate the signal sampling window based upon at least the guidance signal and the speed signal.

7. The system for measuring plant attributes of claim 6, wherein the ECU is further configured to reject the plant signal when it is received outside of the signal sampling window and to accept the plant signal when it is received inside of the signal sampling window.

8. The system for measuring plant attributes of claim 5, wherein the feelers are disposed on the forward tip such that the feelers are deflected by plant stalks, and wherein the vehicle guidance sensor generates the guidance signal in response to such deflection.

9. The system for measuring plant attributes of claim 1, wherein the plant attribute sensor comprises at least one movable stripping plate of a row unit, wherein the at least one movable stripping plate is movable by a plant stalk entering the row unit, and further wherein the plant attribute sensor is configured to generate the plant signal based upon the amount of deflection of the at least one movable stripping plate by the plant stalk entering the row unit.

10. The system for measuring plant attributes of claim 1, wherein the plant signal is for an individual plant of the crops.

11. The system for measuring plant attributes of claim 1, wherein the ECU calculates an end of the signal sampling window based upon an amount of time for the plant to be harvested by the harvesting head.

12. The system for measuring plant attributes of claim 1, wherein the row crop harvesting head comprises a feeler forming the vehicle guidance sensor, stripper plates and stalk rolls and wherein the ECU is configured to calculate a start of the signal sampling window based upon signals received from the feeler and a determined amount of time for the plant to enter into a gap between the stalk rolls and the stripper plates following sensed engagement with the feeler based upon a speed of the combine harvester.

13. The system for measuring plant attributes of claim 12, wherein the ECU is configured to calculate an end of the signal sampling window based upon a determined amount of time for the plant to be pulled completely downward between the stalk rolls and ears of the plant to be snapped off.

14. The system for measuring plant attributes of claim 12, wherein the ECU is configured to calculate an end of the signal sampling window based upon the calculated start of the signal sampling window and a rotational speed of the stalk rolls.

15. The system for measuring plant attributes of claim 1, wherein the plant comprises a corn plant and wherein the ECU is configured to initiate monitoring for impact of an ear of the corn plant at a start of the calculated signal sampling window.

16. The system for measuring plant attributes of claim 15 further comprising a stripper plate, wherein the plant attribute sensor comprises a sensor that outputs signals based upon impact of an ear of corn with the stripper plate wherein the ECU is configured to initiate monitoring for impact of the ear of the corn plant with the stripper plate using the plant attribute sensor at the start of the calculated signal sampling window.

17. A plant attribute sensing system for use with a combine harvester, the sensing system comprising:
a row crop harvesting head;
a first sensor to sense a crop plant prior to separation of the crop plant from soil;
a second sensor to sense an attribute of the crop plant;
an electronic control unit (ECU) configured to calculate a signal sampling window for accepting signals from the second sensor based upon signals from the first sensor and a speed of the combine harvester, wherein the ECU is configured to ignore signals from the second sensor outside the calculated signal sampling window.

18. The plant attribute sensing system of claim 17 further comprising a third sensor to sense an attribute of the crop plant, wherein the ECU is configured accept signals from the third sensor during the calculated signal sampling window and to ignore signals from the third sensor outside the calculated signal sampling window.

19. The plant attribute sensing system of claim 18, wherein the crop plant comprises a corn plant having a stalk and an ear, wherein the combine harvester comprises a movable stripper plate, wherein the second sensor comprise a sensor to sense outward movement of the stripper plate in response to engaging the stalk and wherein the third sensor comprise a sensor to sense impact of the ear with the stripper plate.

20. The plant attribute sensing system of claim 17, wherein the row crop harvesting head comprises stripper plates and stalk rolls and wherein the ECU is configured to:
(1) calculate a start of the signal sampling window based upon signals received from the first sensor and a determined amount of time for the plant to enter into a gap between the stalk rolls and the stripper plates following sensing of the plant by the first sensor and based upon a speed of the combine harvester; and
(2) calculate an end of the signal sampling window based upon a rotational speed of the stalk rolls.

* * * * *